(No Model.)

J. BRAITHWAITE.
OILER FOR LOOSE PULLEYS.

No. 533,522.  Patented Feb. 5, 1895.

WITNESSES:
R. S. Millar
L. M. Adams

INVENTOR,
Jno. Braithwaite,
BY J. C. Bailey
ATTORNEY.

UNITED STATES PATENT OFFICE.

JOHN BRAITHWAITE, OF WINCHESTER, CANADA.

OILER FOR LOOSE PULLEYS.

SPECIFICATION forming part of Letters Patent No. 533,522, dated February 5, 1895.

Application filed April 19, 1894. Serial No. 508,165. (No model.)

*To all whom it may concern:*

Be it known that I, JOHN BRAITHWAITE, a citizen of the United States, residing at Winchester, in the county of Dundas, Province of Ontario, and Dominion of Canada, have invented a new and useful Improvement in Oilers for Loose Pulleys, which improvement is fully set forth in the following specification and accompanying drawings, in which—

Figure 1:
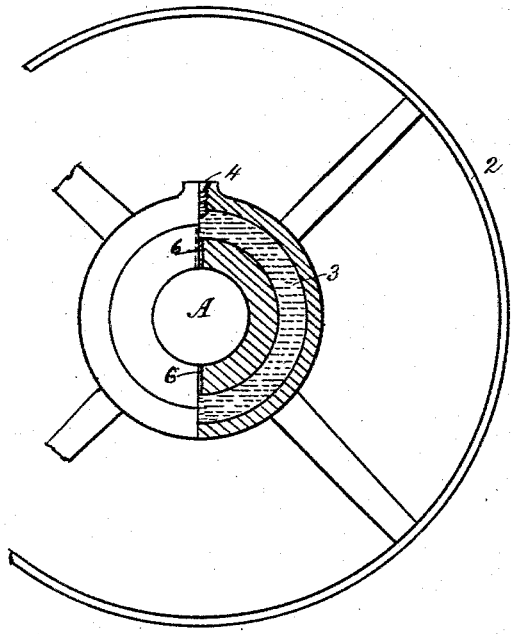
Figure 2:
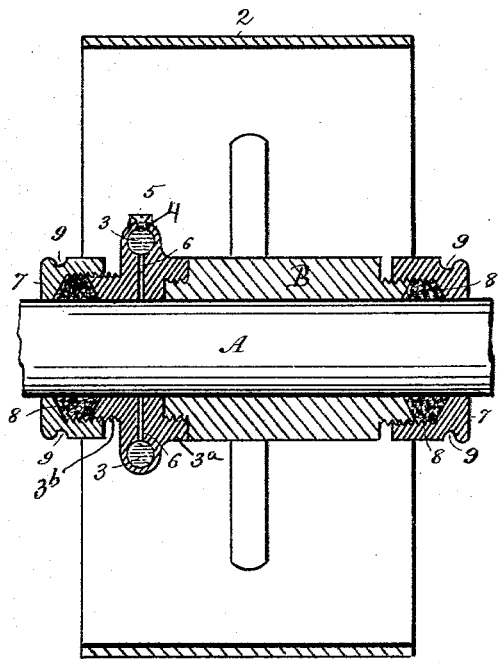

Figure 1 is a side view of a pulley, partly in section; Fig. 2, a central transverse section of the pulley showing the duct through which the oil passes from the reservoir to the shaft.

My invention relates to improvements in appliances for lubricating loose pulleys, and its purpose is to provide a simple, economical and reliable device whereby a continuous and regular supply of lubricating material may be imparted to the bearings in order to prevent damage by heating and unnecessary wearing away of the parts exposed to friction.

The invention consists in connecting with one end of the hub of the pulley, an annular reservoir or oil chamber, having one or more ducts communicating directly with the shaft, and furthermore providing the ends of the pulley hub with stuffing boxes to prevent undue waste of the oil and also to exclude dust or other foreign matter which would injure the lubricant and damage the bearings.

The peculiar features of the device and its several advantages will be readily understood by referring to the accompanying drawings, in which—

A designates the shaft which is designed to have free movement in the pulley 2.

At one end the hub B is provided with an oil chamber 3, consisting of a disk having a central opening for the passage of the shaft and with an annular flange $3^a$ on its inner side which engages with a corresponding reduced portion in one end of the hub. This disk is formed with an annular space near its periphery, forming the oil chamber proper and is provided with a filling opening 4 closed by a screw cap 5. Ducts 6, lead from the oil chamber or reservoir to the central opening in the disk. Said disk is formed at its outer side with an annular flange $3^b$, with which engages a screw cap 7, which encircles the shaft and is cut away to form a recess or stuffing box 8, which is filled with cotton waste, candle wick or other suitable packing material.

At the opposite end the hub is provided with a cap 7, similar to that before described, provided with a stuffing box 8, to receive packing material. Both of said caps are formed with cavities 9, with which a suitable tool may be engaged for removing and replacing the same.

What I claim as new is—

The combination with a pulley having a reduced portion at one end, of the oil chamber having an annular flange on its inner face engaging with said recess, and formed with an annular oil reservoir near its periphery and with radial ducts, the flange formed on the outer face of said disk, the screw cap engaging therewith and forming a stuffing box and the packing material in said stuffing box, substantially as described.

In testimony that I claim the foregoing I have hereunto set my hand, this 28th day of March, 1894, in the presence of witnesses.

JOHN BRAITHWAITE.

Witnesses:
CLARK WASHBURN,
WILLIAM BROWNELL.